(12) United States Patent
Lucks

(10) Patent No.: US 11,448,194 B2
(45) Date of Patent: Sep. 20, 2022

(54) METHOD FOR MEASURING IMBALANCES IN WIND TURBINE ROTORS

(71) Applicant: WINDCOMP GMBH, Baltmannsweiler (DE)

(72) Inventor: Christoph Lucks, Hamburg (DE)

(73) Assignee: WINDCOMP GMBH

( * ) Notice: Subject to any disclaimer, the term of this patent is extended or adjusted under 35 U.S.C. 154(b) by 0 days.

(21) Appl. No.: 16/769,847

(22) PCT Filed: Dec. 29, 2017

(86) PCT No.: PCT/EP2017/084850
§ 371 (c)(1),
(2) Date: Oct. 19, 2020

(87) PCT Pub. No.: WO2019/129373
PCT Pub. Date: Jul. 4, 2019

(65) Prior Publication Data
US 2021/0040939 A1    Feb. 11, 2021

(51) Int. Cl.
*F03D 17/00* (2016.01)
*F03D 13/35* (2016.01)

(52) U.S. Cl.
CPC ............. *F03D 17/00* (2016.05); *F03D 13/35* (2016.05); *F05B 2260/80* (2013.01); *F05B 2260/966* (2013.01); *F05B 2270/327* (2013.01); *F05B 2270/328* (2013.01); *F05B 2270/821* (2013.01)

(58) Field of Classification Search
CPC ...... F03D 17/00; F03D 13/35; F05B 2260/80; F05B 2270/327; F05B 2270/328; F05B 2270/821; F05B 2260/966; Y02E 10/72
See application file for complete search history.

(56) References Cited

U.S. PATENT DOCUMENTS

2009/0266160 A1   10/2009   Jeffrey et al.

FOREIGN PATENT DOCUMENTS

| DE | 102010024532 | 12/2011 | |
|----|--------------|---------|---|
| DE | 102015121981 | 6/2017 | |
| EP | 2582970 | 4/2013 | |
| EP | 3002455 | 4/2016 | |
| WO | WO-2011161058 A1 * | 12/2011 | ........... F03D 7/0224 |

* cited by examiner

Primary Examiner — Joseph Ortega
(74) Attorney, Agent, or Firm — Sand, Sebolt & Wernow Co., LPA

(57) ABSTRACT

The invention relates to the use of laser beams for measuring rotors, in particular wind turbines, for determining an imbalance or defining the absolute setting angle and/or measuring a half-profile of a rotor blade, and a method for determining a torsion of the rotor blade as a deviation between two pitch angles. The invention enables the determining of the absolute pitch angle of a rotor blade during operation, without it being necessary to obtain information relating to the rotor blade or reference points with a known position relative to the pitch axis, in particular using measuring devices that are mobile and/or positioned on the ground. It is also possible to contactlessly detect imbalances.

18 Claims, 5 Drawing Sheets

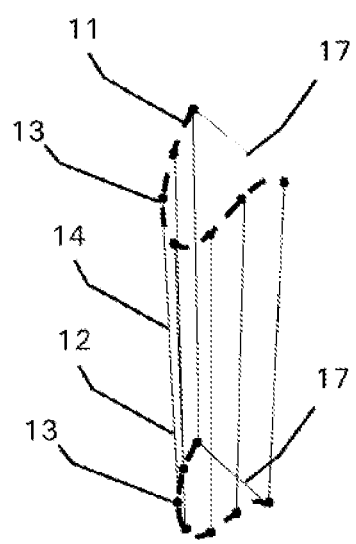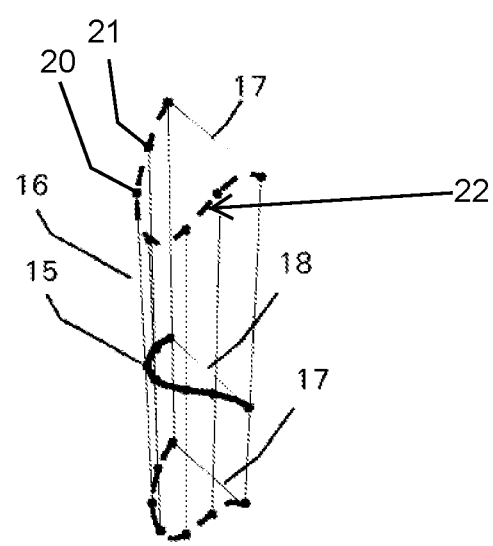
Fig. 6
Fig. 7

METHOD FOR MEASURING IMBALANCES IN WIND TURBINE ROTORS

The invention relates to the measuring of rotors, in particular wind turbines.

It relates in particular to a method for determining and/or measuring an imbalance based on measurements on at least one measurement section.

The invention enables contactless detecting and analyzing of imbalances, in particular using mobile measuring devices and/or measuring devices on the ground.

In addition, the invention relates to a method for defining the absolute pitch angle and/or measuring a half-profile of a rotor blade and to a method for determining a torsion of the rotor blade as a deviation between two pitch angles of the rotor blade.

In contrast to the solution of EP 2582970 A1, the invention enables the defining of the absolute pitch angle of a rotor blade during operation, without it being necessary to obtain information relating to the rotor blade or reference points with a known position relative to the pitch axis or rotor axis, in particular using measuring devices that are mobile and/or positioned on the ground.

From EP 2582970 A1, a solution is known for defining the geometric arrangement, namely by (sub)division of multiple rotor blades of a rotor within its rotation plane, in the defining of which a deviation of this (sub)division from its target value can also be defined. From this, an imbalance of the rotor blades can be defined indirectly, in that it results from deviations from a regular (sub)division. This occurs by measuring at least two measurement lines and defining of a trailing edge on a measured, assumed, and slanted profile on the rotor blade. In contrast thereto, the defining of the imbalance in this invention occurs independently of a second measurement section and independently of the profile of the rotor blades and is not based on the target values of the geometric subdivision of all the rotor blades and can thus also recognize and measure imbalances resulting from other circumstances.

For the measurement according to the prior art, such as, for example, according to EP 2582970 A1, multiple known measurement quantities such as reference points or distances and additional information on the rotor blade are necessary, whereby a truly dynamic, in particular mobile and flexible measurement and evaluation of such measurement values, for example, with regard to absolute pitch angles, is not possible without additional information.

The underlying aim of the invention is to enable, contactlessly and/or independently of additional measurement instruments, in particular additional sensors, such as for example, measurement means fastened in a rotor or in a wind turbine, such as strain gauges, rotation measuring devices, etc., in particular independently of stationary starting points as reference point of the measurement section, and/or independently of additional information with regard to the design, in particular the geometry of the rotor blades, a determining and/or measuring of an imbalance and/or a defining of the absolute setting angle and/or a measuring of a half-profile and/or a determining of a torsion of the rotor blade, in particular using measuring devices that are mobile and/or positioned on the ground, thus in particular independently of stationary reference points.

This aim is achieved by a method for determining and/or measuring, in particular independently, an imbalance, in particular at least a static imbalance and/or an eccentric moment of inertia of a rotor rotating around a rotor axis and comprising at least two rotor blades, wherein the sweep of the rotor blades through at least one measurement section during the rotation of the rotor around the rotor axis is detected by contactless and time-resolved measurement.

Advantageous embodiments include that the method for determining and measuring may include the determining of time spans between the sweep of the measurement section by different, in particular successive, rotor blades. The method for determining and/or measuring may further include the comparing of time spans, in particular the determining of differences between the time spans, between the sweep of, in particular, respective successive rotor blades. The method for determining and/or measuring may further include the normalization of the time spans with respect to the rotational speed which is determined by data of the contactless and time-resolved measurement. The method for determining and/or measuring may further include associating of the time spans or normalized time spans between the sweeps of, in particular successive, rotor blades with respect to the rotor blade sweeping through the at least one measurement section after the respective time span. The method for determining and/or measuring may further include that the measurement section has been and/or is arranged so that, within one or more segments of a circle around the rotor axis, the measurement section is swept by the rotor blades, which extend in an angular range of +/−20°, in particular around the vertical.

This aim is further achieved by a method for determining, in particular independently, the setting angle, in particular the absolute pitch angle, and/or for measuring a half-profile of a rotor blade of a rotor rotating around a rotor axis, wherein, by contactless distance measuring on a least two measurement sections which are not parallel to the rotor axis and which are oriented so that the at least two measurement sections are swept at least also simultaneously by a rotor blade, at least during the sweep of the rotor blade through the measurement sections, on each measurement section, at least twenty distance measurement values, in particular in each case at least twenty measurement points on the rotor blade, are detected, wherein in particular the angles between the measurement sections and the horizontal are measured, and wherein in each case at least a first and a second connection line, in particular at least ten connection lines, are determined between at least two interpolation points) which are each given by a measurement point and/or a point on an interpolation of the measurement points of a measurement line, wherein the interpolation points, in particular the interpolation points of each of the connection lines, lie at least on two different measurement lines, and wherein the measurement lines in each case are given by connecting the measurement points at which the measurement values of a respective measurement section on the rotor blade were obtained, wherein, between the sweep of the interpolation points of a connection line, through the measurement sections, there is a maximum temporal spacing of ⅕ s and/or a maximum temporal spacing in which the rotor is rotated maximally by 0.5° around the rotor axis.

Advantageous embodiments include that the at least two measurement sections may be oriented so that the at least two measurement sections are located within a common plane which is arranged in particular parallel to the rotor axis and/or at an angle of less than +/−20° with respect to the rotor axis and/or is arranged vertically. Advantageous embodiments may further include that from the measurement values at the measurement points, in particular based on the connection lines, a half-profile may be calculated, which is in particular perpendicular to an edge, in particular trailing edge, of the rotor blade and/or perpendicular to the first or second connection line and/or parallel to a plane perpendicular to the rotor axis. Advantageous embodiments may further include that the method may be carried out using the angles between the measurement sections and the horizontal. Advantageous embodiments may further include the interpolation of an assumed rotor blade surface and/or rotor blade partial surface and may preferably include interpolation of a partial surface by connecting multiple connection lines and in particular generation of a half-profile as section through the assumed rotor blade surface. Advantageous embodiments may further include that the pitch angle may be determined as angle between a plane perpendicular to the rotor axis and a line which extends parallel to the linking line from the leading edge to the trailing edge of the rotor blade and/or to the calculated half-profiles and/or which extends perpendicularly to an edge, in particular a trailing edge of the rotor blade and/or perpendicularly to at least one of the first or second connection line, wherein the line in particular intersects the first and a second connection line and/or extends perpendicularly thereto, wherein the interpolation points between which the first connection line extends have a maximum temporal spacing of ½ s, in particular maximally ⅕ s and/or a maximum temporal spacing in which the rotor is rotated by maximally 1°, in particular 0.5° around the rotor axis, from the leading edge of the rotor blade, and the measurement points between which the second connection line extends have a maximum temporal spacing of ½ s, in particular of maximally ⅕ s and/or a maximum temporal spacing in which the rotor is rotated maximally by 1°, in particular 0.5° around the rotor axis, from the trailing edge of the rotor blade.

This aim is further achieved by a method for determining, in particular independently, a torsion of the rotor blade as a deviation between two pitch angles, wherein the pitch angles are each defined as angles between a plane perpendicular to the rotor axis and in each case a different line, wherein the first line used for determining the first pitch angle lies between interpolation points of a first and a second measurement line, and the second line used for determining the second pitch angle lies between interpolation points of a third measurement line and the second measurement line or of the third measurement line and a fourth measurement line, wherein, with respect to the horizontal, the inclination angle of the measurement section of the first measurement line is smaller than that of the second measurement line, which is smaller than that of the third measurement line, and/or, with respect to the horizontal, the inclination angle of the measurement section of the first measurement line is smaller than that of the second measurement line, which is smaller than that of the third measurement line, which is smaller than that of the fourth measurement line.

This aim is further achieved by a method for determining, in particular independently, a torsion of a rotor blade of a rotor rotating around a rotor axis, wherein, by contactless distance measurement on at least two measurement sections which are not parallel to the rotor axis and which are oriented so that the at least two measurement sections are at least also simultaneously swept by a rotor blade, at least during the sweep of the rotor blade through the measurement sections on each measurement section, at least twenty distance measurement values, in particular in each case at least twenty measurement points on the rotor blade, are detected, wherein the angles between the measurement sections and the horizontal are measured, and wherein at least a first and a second connection line, in particular at least ten connection lines are determined in each case between at least two interpolation points which are given in each case by a measurement point and/or point on an interpolation of the measurement points of a measurement line, wherein the interpolation points, in particular the interpolation points of each connection line, lie at least on two different measurement lines, and wherein the measurement lines in each case are given by connecting the measurement points at which the measurement values of a respective measurement section on the rotor blade were obtained, wherein, between the sweep of the interpolation points of a connection line through the measurement sections, there is a maximum temporal spacing of ⅕ s and/or a maximum temporal spacing in which the rotor is rotated maximally by 0.5° around the rotor axis, as angles between two lines which in each case extend parallel to the linking line from a leading edge to a trailing edge of the rotor blade and/or which extend perpendicularly to an edge, in particular trailing edge, of the rotor blade and/or perpendicularly to at least a first or a second connection line and which extend in particular in planes that are parallel to one another, wherein the line in particular intersects the first and a second connection line and/or extends perpendicularly thereto, wherein the interpolation points between which the first connection line extends have a maximum temporal spacing of ½ s, in particular of maximally ⅕ s and/or a maximum temporal spacing in which the rotor is rotated maximally by 1°, in particular 0.5° around the rotor axis, from the leading edge of the rotor blade, and the measurement points between which the second connection line extends have a maximum temporal spacing of ½ s, in particular of maximally ⅕ s and/or a maximum temporal spacing in which the rotor is rotated maximally by 1°, in particular 0.5° around the rotor axis, from the trailing edge of the rotor blade, are defined, wherein the first line lies between interpolation points of a first measurement line and a second measurement line, and the second line lies between interpolation points of a third measurement line and the second measurement line or of the third measurement line and a fourth measurement line, wherein, with respect to the horizontal, the inclination angle of the measurement section of the first measurement line is smaller than that of the second measurement line, which is smaller than that of the third measurement line, and/or, with respect to the horizontal, the inclination angle of the measurement section of the first measurement line is smaller than that of the second measurement line, which is smaller than that of the third measurement line, which is smaller than that of the fourth measurement line.

Advantageous embodiments may include using a mobile measuring device which comprises devices for the contactless distance measurement along measurement sections, wherein the implementation is in particular independent of stationary reference points and/or independent of additional measurement instruments, in particular additional sensors, in particular those with direct contact or known arrangement with respect to the rotor and/or independent of additional information with regard to the design, in particular the geometry of the rotor blades and/or arrangement of the measurement sections and/or measuring device relative to the rotor.

In this application, a measurement section represents in particular the line on which a distance is measured, in particular the line on which a laser beam which is used for the distance measurement is transmitted and propagates and in particular is also reflected, in particular independently of additional attached sensors on an object, in particular the line between measurement point and measurement apparatus, wherein the measurement point on the measurement section can shift, in particular the measurement point on the measurement section and thus the end point of the measurement section is variable, depending on where the measurement section starting from the measurement apparatus first strikes a reflecting object and/or absorbing object. Considered mathematically, the measurement section is thus a beam, in particular a beam starting from the measurement apparatus. An object which sweeps a measurement section, for example, a rotor blade, comes in contact at different points of the surface of the measurement section with a laser beam shining along the measurement section. The line over the surface points which are in contact, in particular successively, with the measurement section and/or with the laser beam on a measurement section, forms a measurement line on the object, particularly a rotor blade, on which, at measurement points, measurement values can be obtained, for example, in the form of distances between measurement apparatus and surface point.

Here, the measurement lines are fixed on the rotating object, in particular the rotor blade, and thus they rotate with the rotor blade, of which the rotor is a part, around an axis of the rotor. By means of a laser, it is also possible to detect multiple measurement sections and thus measurement values on multiple measurement lines on a rotor blade. For this purpose, the laser beam can be redirected and/or deflected in temporally rapid succession, so that it propagates along different measurement sections. As a result, measurement values can be obtained at measurement points on different measurement lines of the measurement sections, in each case time-delayed with respect to one another.

Here, for the methods according to the invention, the contactless measurement occurs in a time-resolved manner according to the invention.

The contactless measurements can be carried out, for example, via a laser. For a distance measurement, a travel time measurement is conceivable, for example. Here, a contactless spacing measurement system or distance measurement system can be used.

The methods are particularly suitable for use on rotors of a wind turbine. A wind turbine comprises at least two, in particular two, three or four, elongate rotor blades mounted on a common hub, which are part of a rotor rotating around a rotor axis.

The methods also comprise in particular the orientation of at least one contactless spacing measurement system so that its measurement section is swept by the rotor blade, or on the measurement sections, respectively along the at least one measurement section, which is/are swept by the at least one rotor blade, and in the case of multiple measurement sections, they have different spacings from the hub. Here, the contactless spacing measurement system is suitable for detecting spacings which are time-delayed by at most 200 milliseconds on the at least one measurement section.

In the detecting of the temporal spacing between the detecting of measurement values, it is important that, during the sweep of a rotor blade through the measurement section, a sufficient number of measurement values can be obtained in order to be able to generate, for example, an informative profile or to define a precise time of the sweep of the rotor blades or to achieve sufficient precision to obtain more informative results and/or it is important that the edge areas, such as leading edge and trailing edge, of the rotor blade are detected sufficiently precisely. This is ensured if, under the usual operating conditions of a wind turbine, the measurement can occur or occurs at two measurement points at a spacing of maximally 200 milliseconds. In wind turbines with high rotational speeds and long blade lengths, a considerably quicker detection may be necessary, particularly if measurement values are to be acquired on the outer end or area of the rotor blades. Here, a time-delayed measurement with time delay and/or a maximum temporal spacing of maximally five milliseconds can be appropriate. The greater the number of measurement values per rotor blade to be acquired, the more rapidly such measurements have to occur. As a rule, at least ten measurement values per measurement line and/or measurement section on a rotor blade have to be acquired in order to be able to generate a sufficient database. If measurement values are acquired on more than two measurement sections, the spacing of the measurements must in particular be selected to be correspondingly smaller. The mentioned condition can as a rule be satisfied if a measurement is carried out for each measurement section within 200 ms. As described above, a considerably smaller time interval in certain installations or measurement lines located farther out on the rotor blade can be selected.

The aim is achieved in particular by a method for determining and/or measuring an imbalance, in particular at least one static imbalance, and/or an eccentric moment of inertia of a rotor rotating around a rotor axis. Here, the rotor comprises at least two rotor blades, wherein, by contactless and time-resolved measurement, the sweep of the rotor blades through at least one measurement section during the rotation of the rotor around the rotor axis is detected.

Thus, at least one measurement section which is swept by the rotor blades when the rotor blades rotate around the rotor axis must be provided. Here, the sweep of the rotor blades through the measurement section is detected. This can occur, for example, by a distance measurement which shows a longer or infinite distance when the measurement section is not swept by a rotor blade. It shows a shorter distance, namely the distance between measurement apparatus and rotor blade, when the rotor blade sweeps through the measurement section. Thus, it is also possible to work without a free background, if, at least when the rotor blades do not sweep the measurement section, another and/or a different, in particular a distinguishable, distance is shown. However, other types of detection of the sweep of the measurement section are also conceivable.

Here, at least one static and/or dynamic imbalance can be detected. However, in particular, at least one static imbalance is detected.

The detection of such an imbalance can occur here in particular by means of the detection of different time spans between the sweep of the measurement section by different, in particular successive, rotor blades.

Accordingly, the method comprises in particular the determining of time spans between the sweep of the measurement section by different, in particular successive, rotor blades.

Here, in particular, based on a comparison, in particular a difference calculation, of the time spans between the sweep of the rotor blades through the measurement section, in particular in each case between two successive rotor blades, an imbalance can be recognized and/or measured or defined. Here, the method comprises in particular the determining of differences between the time spans between the sweep of, in particular, in each case successive rotor blades.

Particularly advantageously, in particular before a difference calculation and/or before a comparison, the time spans, are normalized with respect to the rotational speed. Here, in particular in the case of different rotational speeds around the rotor axis, it is helpful if, in particular, multiple time spans detected in different rotations, in particular at different rotational speeds, are compared and/or aggregated. For this purpose, in particular, the rotational speed can also be detected, in particular contactlessly. This occurs particularly advantageously by means of the measurement section which is used in any case. This can occur, for example, by evaluating the time spans between the sweep of the rotor blades, in particular the time span between the sweep of multiple rotor blades, in particular of the number of rotor blades contained in the rotor.

Thus, particularly advantageously, the rotational speed is determined from the data of the contactless and time-resolved measurement.

Particularly advantageously, the time spans or normalized time spans between the sweep are thus associated with the rotor blades of the rotor so that the time spans or normalized time spans are associated with a rotor blade which at the end of the time span sweeps through the measurement section. Here, in particular, in each case the time span or normalized time span which has elapsed between the sweep of the preceding rotor blade through the measurement section and this rotor blade is associated with a rotor blade. Thereby, the time spans or normalized time spans in each case can be used as a measurement of the torque exerted by the rotor blade. Thereby, static imbalances in particular can be rapidly recognized and associated in a simple way with a rotor blade.

Particularly advantageously, the measurement section is arranged, and/or the measurement sections are arranged and/or oriented so that the rotor blades of the rotor sweep through the measurement section in a segment of a circle around the rotor axis with a circular segment extent of +/−20°, in particular +/−10°, around the vertical. Particularly advantageously, the rotor blades sweep through the measurement section on a vertical through the rotor axis. Due to such a design, the time spans are particularly significant with regard to an imbalance, in particular a static imbalance. The angle indications relate to a division of the full circle or full angle into 360°.

An eccentric moment of inertia of a rotor is understood to mean, in particular, a moment of inertia outside of the rotor axis.

The measurement section is oriented in particular so that the rotor blades sweep through the measurement section outside of a hub and in particular with an area of the rotor blades which is at a distance of at least 5 m, in particular at least 15 m, outside of and/or away from the rotor axis.

A normalization of time spans with respect to the rotational speed can be obtained in particular by dividing the time spans by a value which is the same at least for identical rotational speeds or a value which is proportional to the reciprocal of the rotational speed or by subtracting a value which is the same at least for identical rotational speeds or a value which is proportional to the reciprocal of the rotational speed from the time spans. In particular, this can occur by dividing the time spans by the duration of a rotation of the rotor around the rotor axis.

Particularly advantageously, the time spans associated with a rotor blade are averaged over multiple time spans from different rotations, in particular with normalization of the time spans with respect to the rotational speed before the averaging.

Particularly advantageously, the sweep of the rotor blades through the measurement section is detected at least over ten rotations of the rotor. In particular, time spans of at least ten rotations are averaged. Not all the time spans of the rotations should be averaged here to obtain an average, instead, in particular, the time spans associated with a rotor blade should be averaged in each case, so that an averaged value is obtained for each rotor blade.

In an embodiment, the method can be implemented with rotation of the rotor at constant rotational speed.

In particular, the method is carried out when the rotor is driven by wind alone.

Particularly advantageously, the measurement section extends in a plane in which the rotor axis lies and/or at an angle with respect to such a plane of less than +/−20° with respect to this plane. In particular, the measurement section lies in a vertical plane.

Particularly advantageously, the measurement section is kept static and/or constant in relation to the rotor axis and/or the ground for the duration of the method, but in particular at least for the duration of a determination, in particular for at least 5 minutes.

Particularly advantageously, the method also comprises the recording of half-profiles and/or spacings of the rotor blades and/or of the points and/or of at least one point of each rotor blade which sweeps through the measurement section, from the starting point of the measuring device. Particularly advantageously, such values are used to mathematically calculate a rotation and/or a change of the rotor axis and/or a change of the yaw angle and/or a vibration of the tower from the measurement values of the sweep or of the time spans. Indeed, a change of the yaw angle and/or of the position of the rotor axis has/have an influence on the relative position of the measurement section with respect to the rotor and thus can influence the measurement and/or time spans, albeit only to a relatively small extent. By measuring the spacings and/or half-profiles, the change in the position of the rotor axis can be detected and thus taken into consideration to the effect that the time spans and/or measurement are corrected accordingly.

Particularly advantageously, the method comprises an evaluation of the measurement, in particular of the time spans, which shows (relative) weight differences and/or (relative) torques of the rotor blades. This can occur particularly advantageously by comparing the time spans associated with the rotor blades. In particular, the ratio of the time spans which are associated with the individual rotor blades is used as a measure of the relative weight of the rotor blades.

The aim is also achieved by a method for defining the setting angle, in particular the absolute pitch angle and/or for measuring at least one half-profile of a rotor blade of a rotor rotating around a rotor axis.

Here, by a contactless distance measurement on at least two measurement sections which are not parallel to the rotor axis and which are oriented so that they are at least also simultaneously swept by a rotor blade, at least when the rotor blade sweeps through the measurement sections, on each measurement section, at least twenty distance measurement values, in particular at least twenty measurement points on the rotor blade are detected.

An at least also simultaneous sweep is understood to mean a situation in which at least at one time, the at least two measurement sections are swept by a rotor blade. Due to the width of rotor blades which usually varies and predominantly tapers with larger spacing with respect to the rotor axis over their longitudinal extent and due to the arrangement of the measurement sections so that they are swept by the rotor blade with different spacings from the rotor axis, and due to the different circumferential speed at the site of the sweep of the rotor blades, a situation frequently occurs, in which the rotor blades in fact sweep through the measurement sections with their entire width, but this does not completely coincide in time. Thus, the sweep is not completely simultaneous to the extent that the start and the end point with respect to the sweep of the different measurement sections do not coincide. Instead, it is at least also simultaneous, so that during the sweep through a first of the measurement sections, a second of the measurement sections is also swept.

Particularly advantageously, the at least two measurement sections are oriented so that they extend within a common plane which is arranged parallel to the rotor axis and/or at an angle of less than +/−20° with respect to the rotor axis and/or vertically.

Here, the measurement sections are oriented and/or arranged so that they are swept by the rotor blade at different spacings from the rotor axis. In particular, the measurement lines lie on the rotor blade so that they have different spacings with respect to the rotor axis.

Here, in particular the angles between the measurement sections and the horizontal can be measured. In particular, the measurement sections start from a common point, and/or the distance measurement values are detected and/or converted so that they indicate the distance from a common point and/or a common, in particular vertical, plane perpendicular to the rotor axis.

According to the invention, at least a first and a second connection line, in particular at least ten connection lines are determined in each case between at least two interpolation points which in each case are given by a measurement point and/or a point on an interpolation of the measurement points on a measurement line, wherein the interpolation points, in particular the interpolation points of each connection line lie at least on two different measurement lines and wherein the measurement lines in each case are given by connecting the measurement points at which the measurement values of a respective measurement section on the rotor blade were obtained. Here, in each case, between the sweep of the interpolation points between which a connection line lies, through the measurement sections, there is a maximum temporal spacing of 200 ms and/or a maximum temporal spacing in which the rotor is rotated by at most 0.5° about the rotation axis.

Particularly advantageously, by such a connection line, in particular by multiple such connection lines at different interpolation points, at least a portion of the surface of the rotor blade can be reconstructed at least approximately.

Particularly advantageously, with knowledge of the arrangement of the measurement section, in particular of the angle of the measurement sections with respect to the horizontal, at a site between the interpolation points, for example, by means of a virtual horizontal section through the at least partially and at least approximately reconstructed rotor blade surface, a partial cross section through the rotor blade and/or a rotor blade half-profile can then be obtained. Alternatively, a half-profile and/or a partial cross section can also be obtained in that, on the connection lines, depending on the angles between the measurement sections and the horizontal, points are defined which lie together in a plane, in particular in a plane perpendicular to the rotor blade longitudinal axis, and represent a half-profile.

Based on the at least two connection lines or values obtained or derived therefrom and/or based on a partial cross section and/or a rotor blade half-profile, at least a setting angle, in particular an absolute pitch angle of the rotor blade can be determined.

According to the invention, that is to say by obtaining distance measurements on a rotor blade at different spacings with respect to the rotor axis, in particular distance measurements which reproduce at least two slanted half-profiles and/or partial cross sections of the rotor blade, a correct half-profile and/or a setting angle, in particular an absolute pitch angle, is/are defined. Slanted here means in particular that the blades do not lie within a plane perpendicular to the rotor longitudinal axis. Here, on the one hand, they are as a rule tilted in a manner corresponding to the angle between the respective measurement section and the horizontal and in particular circular arcs in annular form extend over the points of the rotor blade surface which during the sweep through the measurement section sweep through same.

Here, in particular with the help of the connection lines and a virtual section through the connection lines, a partial profile or a half-profile is determined, which extends in particular perpendicularly to the longitudinal extent of the rotor blade and in particular over a straight line on the rotor blade.

Particularly advantageously, from the measurement values at the measurement points of a measurement line, a half-profile is calculated in each case. Here, the half-profile extends in particular perpendicularly to an edge, in particular trailing edge of the rotor blade and/or perpendicularly to the at least first or second connection line and/or parallel to the rotation axis and/or in a plane perpendicular to the longitudinal extent of the rotor blade and/or parallel to a plane which extends perpendicularly to the rotation axis, and represents in particular a section through the rotor blade, which extends in a plane parallel to the rotor axis and in particular perpendicularly to the longitudinal extent of the rotor blade. Here, the half-profile can also be a curved half-profile which extends in particular over a circular arc section which coincides with the circular arc section formed by the points which sweep the measurement section.

In particular, for each measurement section, first a circular arc-shaped and slanted half-profile is calculated in particular as interpolation of the measurement points of a measurement line. This half-profile lies, in particular, in a plane which does not extend perpendicularly to the longitudinal extent of the rotor blade, but rather is tilted with respect to a plane perpendicularly to the longitudinal extent of the rotor blade at an angle which in particular corresponds to the angle between the corresponding measurement section and the horizontal. In particular, based on this, using interpolation points on the circular arc-shaped slanted half-profiles and connection lines between the interpolation points, a half-profile is determined, which extends in particular perpendicularly to an edge, in particular a trailing edge of the rotor blade and/or perpendicularly to the at least first or second connection line and/or perpendicularly to a plane perpendicular to the rotation axis and represents in particular a cross section through the rotor blade which extends in a plane parallel to the rotor axis and in particular perpendicularly to the longitudinal extent of the rotor blade and in particular along a straight line.

In particular, for the determining of the position of the half-profile which extends in particular perpendicularly to the longitudinal extent of the rotor blade and which extends in particular along a straight line, the angles between the measurement sections of the used slanted half-profiles with respect to the horizontal are used. Thereby, it can be determined in particular how a half-profile has to lie in a plane perpendicular to the rotation axis relative to the slanted half-profiles.

Particularly advantageously, for the interpolation of an assumed rotor blade surface, multiple connection lines, in particular at least ten connection lines are defined, this set of connection lines can then be used as assumed rotor blade surface, and/or an interpolated surface can be defined between them, which can then be used as assumed rotor blade surface.

Particularly advantageously, the method is designed as a method for determining the absolute pitch angle. The absolute pitch angle is defined in particular based on half-profiles in a plane perpendicular to the rotor blade longitudinal extent and/or an assumed rotor blade surface and/or the rotor axis. In particular, a linking line between leading edge and trailing edge of the assumed rotor blade surface and/or of such half-profiles can be defined, and in particular the angles of such a linking line with respect to a plane perpendicular to the rotor axis and/or rotor blade longitudinal extent and/or an assumed rotor blade surface can be defined and used as absolutely pitch angle.

Particularly advantageously, the position of the rotor axis is determined from the measurement values on the measurement sections, in particular by averaging the measurement values. For this purpose, in particular at least two measurement sections that are swept by the rotor blades at different rotation angles of the rotation around the rotation axis are used. Based on measurement values on these measurement sections, the rotation plane of the rotors can be defined and thus the position of the rotor axis can be approximated. Alternatively, a defining of the position of the rotor axis can also be omitted and only a plane perpendicular to the rotor axis can be defined by such measurement values. This is sufficient in order to determine the absolute pitch angle as described above, since said pitch angle is defined only with respect to a plane perpendicular to the rotor axis, and, for this, the position of the rotor axis does not have to be fully known, but instead knowledge of the position of a plane perpendicular to the rotor axis is sufficient.

Particularly advantageously, the absolute pitch angle is determined as angle between a plane perpendicular to the rotor axis and a line which extends parallel to the linking line of leading edge and trailing edge of the rotor blade, a partial profile in a plane perpendicular to the longitudinal extent of the rotor blade and/or an assumed rotor blade surface and/or a line which extends perpendicularly to an edge, in particular trailing edge, of the rotor blade and/or perpendicularly to at least the first or second connection line, wherein the line in particular intersects the first connection line and a second connection line and/or extends perpendicularly thereto, wherein the interpolation points between which the first connection line extends have a maximum temporal spacing of 0.5 seconds, in particular of maximally 200 ms and/or a maximum spacing in which the rotor is rotated maximally by 1°, in particular 0.5°, around the rotor axis, from the leading edge of the rotor blade, and the interpolation points between which the second connection line extends have a maximum temporal spacing of ½ s, in particular of maximally ⅕ s and/or a maximum temporal spacing in which the rotor is rotated maximally by 1°, in particular 0.5° around the rotation axis, from the trailing edge of the rotor blade. The aim is also achieved by a method for determining a torsion of the rotor blade as a deviation between two pitch angles, wherein the pitch angles are defined as angles between a plane perpendicular to the rotor axis and a line which extends parallel to the linking line of leading edge and trailing edge of the rotor blade, a partial profile in a plane perpendicular to the longitudinal extent of the rotor blade and/or an assumed rotor blade surface and/or a line which extends perpendicularly to an edge, in particular a trailing edge, of the rotor blade and/or perpendicularly to the at least first or second connection line, wherein the interpolation points between which the first connection line extends have a maximum temporal spacing of 0.5 seconds, in particular of maximally 200 ms and/or a maximum spacing in which the rotor is rotated by at most 1°, in particular 0.5°, around the rotor axis, from the leading edge of the rotor blade, and the interpolation points between which the second connection line extends have a maximum temporal spacing of ½ s, in particular of maximally 1.5 s and/or a maximum temporal spacing in which the rotor is rotated by at most 1°, in particular 0.5° about the rotation axis, from the trailing edge of the rotor blade, wherein the first line used for the determining of the first pitch angle lies between measurement points of a first measurement line and a second measurement line and the second line used for the determining of the second pitch angle lies between measurement points of a third measurement line and the second measurement line or of the third measurement line and a fourth measurement line, wherein the inclination angles of the measurement section of the different measurement lines with respect to the horizontal behave in particular as follows:

Inclination angle of the measurement section of the measurement points of the first measurement line<inclination angle of the measurement section of the measurement points of the second measurement line<inclination angle of the measurement section of the measurement points of the third measurement line and/or inclination angle of the measurement section of the measurement points of the first measurement line<inclination angle of the measurement section of the measurement points of the second measurement line<inclination angle of the measurement section of the measurement points of the third measurement line<inclination angle of the measurement section of the measurement points of the fourth measurement line.

Alternatively, the deviation between two pitch angles can also be determined based on half-profiles or partial cross sections which are defined in two different planes perpendicular to the longitudinal extent of the rotor blade and/or in mutually parallel planes, in particular by comparison of said half-profiles or partial cross sections and/or based on the angles between the lines between leading edge and trailing edge in these half-profiles and/or partial cross sections.

The aim is also achieved by a method for determining a torsion of the rotor blade as angle between two lines from the leading edge to the trailing edge, in particular in mutually parallel planes, in particular in planes perpendicular to the longitudinal extent of the rotor blade.

Here, in particular, the detecting is carried out as in the above-described method and then the lines from the leading edge to the trailing edge are defined and the angle in between said lines is defined.

The method for determining a torsion of a rotor blade of a rotor rotating around a rotor axis is here carried out in particular so that, by contactless distance measurement on at least two measurement sections which are not parallel to the rotor axis and which are oriented so that they are at least also simultaneously swept by a rotor blade, at least during the sweep of the rotor blade through the measurement sections, on each measurement section, at least 20 distance measurement values, in particular in each case at least 20 measurement points on the rotor blade, are detected, wherein the angles between the measurement sections and the horizontal are measured, and wherein at least a first connection line and a second connection line, in particular at least 10 connection lines between at least two interpolation points are determined in each case, which in each case are given by a measurement point and/or a point on an interpolation of the measurement points of a measurement line, wherein the interpolation points, in particular the interpolation points of each connection line, lie at least on two different measurement lines, and wherein the measurement lines in each case are given by the connecting of the measurement points at which the measurement values of a respective measurement section on the rotor blade were obtained, wherein, between the sweep of the interpolation points of a connection line through the measurement sections, there is a maximum temporal spacing of ⅕ s and/or a maximum temporal spacing in which the rotor is rotated by at most 0.5° around the rotor axis, as angle between two lines which in each case extend parallel to the linking line from a leading edge to a trailing edge of the rotor blade and/or which extend perpendicularly to an edge, in particular a trailing edge, of the rotor blade and/or perpendicularly to at least a first or second connection line, and which extend in particular in mutually parallel planes, wherein the lines in particular intersect the first connection line and a second connection line and/or extend perpendicularly thereto, wherein the interpolation points between which the first connection line extends have a maximum temporal spacing of ½ s, in particular maximally 1.5 s and/or a maximum temporal spacing in which the rotor is rotated by at most 1°, in particular 0.5° around the rotor axis, from the leading edge of the rotor blade, and the measurement points between which the second connection line extends have a maximum temporal spacing of ½ s, in particular of maximally 1.5 s and/or a maximum temporal spacing in which the rotor is rotated by at most 1°, in particular 0.5°, around the rotor axis, from the trailing edge of the rotor blade, are defined, wherein the first line lies between interpolation points of a first measurement line and a second measurement line and the second line lies between interpolation points of a third measurement line and the second measurement line or the third measurement line and a fourth measurement line, wherein the inclination angles of the measurement sections with respect to the horizontal behave as follows with respect to one another:

Inclination angle of the measurement section of the measurement points of the first measurement line<inclination angle of the measurement section of the measurement points of the second measurement line<inclination angle of the measurement section of the measurement points of the third measurement line and/or inclination angle of the measurement section of the measurement points of the first measurement line<inclination angle of the measurement section of the measurement points of the second measurement line<inclination angle of the measurement section of the measurement points of the third measurement line<inclination angle of the measurement section of the measurement points of the fourth measurement line.

In particular, the measurement sections in general are arranged so that they enclose between one another an angle of at least 5° and so that their spacing on a rotor which at least also simultaneously sweeps said measurement sections is 1 to 15 m. In particular, a sufficient number of measurement sections are arranged such that their maximum spacing on a rotor blade which at least simultaneously sweeps them is at least 15 m.

In particular, the devices for the contactless distance measurement along measurement sections comprises the use of a mobile measuring device, wherein the performance is in particular independent of stationary reference points and/or independent of additional measurement instruments, in particular additional sensors, in particular sensors with direct contact and/or known arrangements with respect to the rotor and/or independent of additional information with regard to the design, in particular the geometry of the rotor blades and/or arrangement of the measurement sections and/or measuring device relative to rotor.

BRIEF DESCRIPTION OF THE SEVERAL VIEWS OF THE DRAWINGS

Additional advantages and possible embodiments will be explained purely as examples and in a non-limiting manner in reference to the following figures. The figures show.

DETAILED DESCRIPTION

Figure 1:
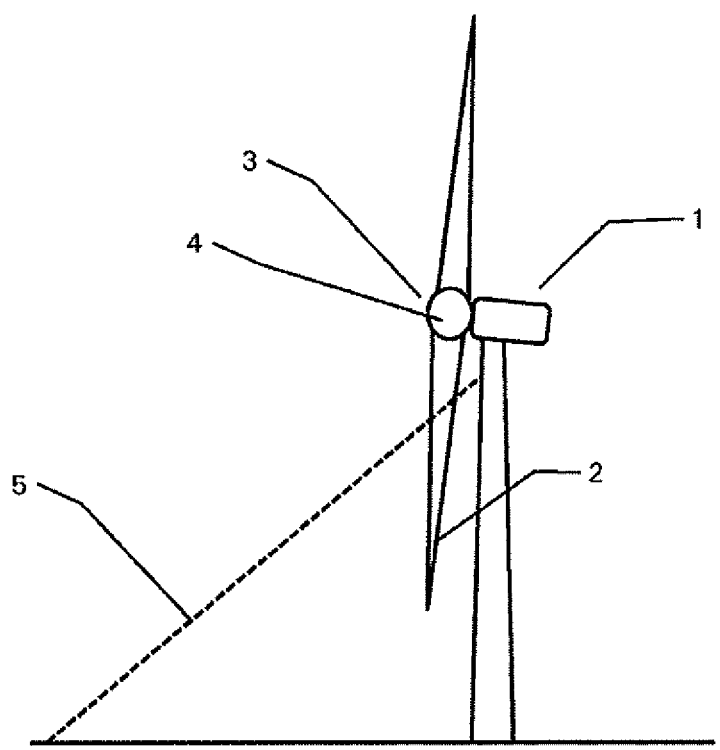
FIG. 1: a side view of a wind turbine with a measurement section directed onto its rotor.

FIG. 1 shows a side view of a wind turbine 1 with a rotor 3 with a hub 4 and three rotor blades 2 of which only two are shown in this representation. A laser beam of a laser distance measuring device is oriented along a measurement section 5 onto the rotor 3.

Figure 2:
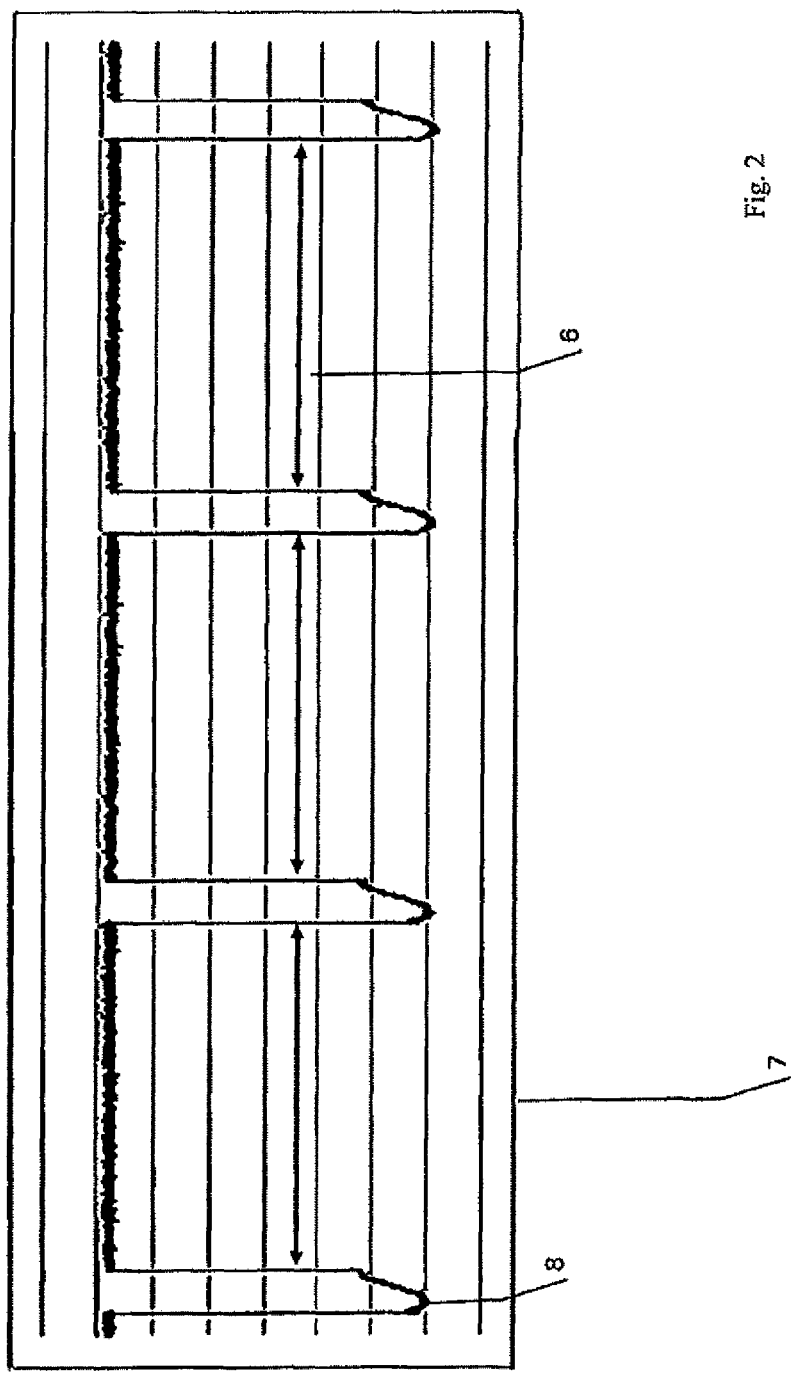
FIG. 2: a representation of the time-resolved distance measurement values measured on the measurement section from FIG. 1, FIG. 3: a side view of the wind turbine from FIG. 1 with two measurement sections directed onto its rotor.

FIG. 2 shows a time-resolved representation of the measurement values of the laser distance measuring device from FIG. 1. A time axis 7 on which the distance measurement values 8 are plotted is represented. Three rotor blade sweeps through the measurement section 5 can be seen as deflections of the measurement values downward. At the end of the deflections, in each case a half-profile of the respective rotor blade can also be seen. Between the sweeps of the rotor blades, time spans 6 between the rotor blade sweeps are drawn as double arrows.

By comparing the time spans 6, in particular the differences and/or ratios thereof, imbalances can be detected. Here, the ratio of the time spans 6 associated with the individual rotor blades is used as a measure of the relative weights of the rotor blade, in that they are associated with the rotor blade sweeping through the measurement section after the time span 6.

Figure 3:
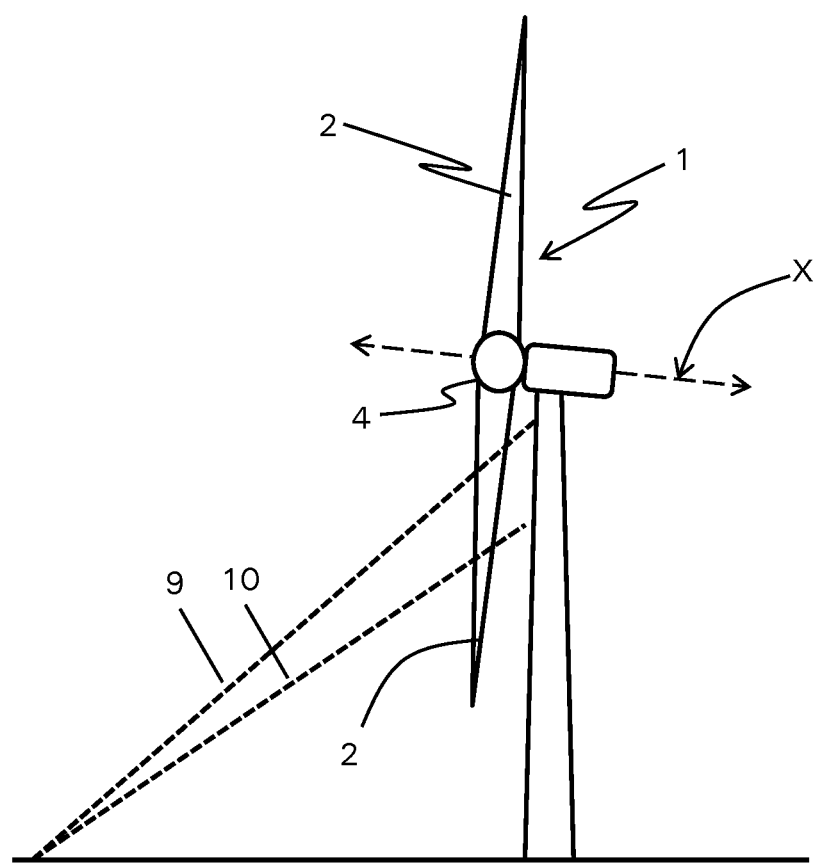

FIG. 3 shows the wind turbine from FIG. 1 in a side view. On two measurement sections 9, 10 with different angles with respect to the horizontal, laser distance measuring devices are directed onto the rotor.

Figure 4:
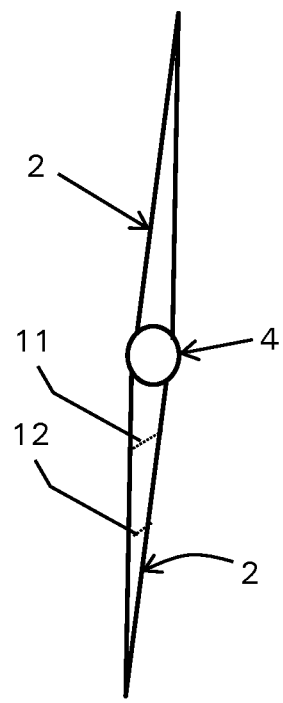
FIG. 4: a side view onto the rotor from FIG. 3, FIG. 5: a front view onto the rotor from FIG. 4, FIG. 6: a representation of two slanted half-profiles with connection lines, FIG. 7 a representation of two slanted half-profiles with connection lines and a half-profile perpendicular to the rotor blade longitudinal direction and FIG. 8 a representation of two slanted half-profiles and a half-profile perpendicular to the longitudinal axis of the rotor blade as well as two measurement sections.

FIG. 4 shows the rotor from-FIG. 3 in the side view from FIG. 3. The position of the half-profiles 11, 12 detected by the laser distance measurement on the measurement sections 9, 10 are drawn with dashed lines. One can see that the profiles are not oriented perpendicularly with respect to the rotor longitudinal axis but instead are oriented at a slant relative to said rotor longitudinal axis.

Figure 5:
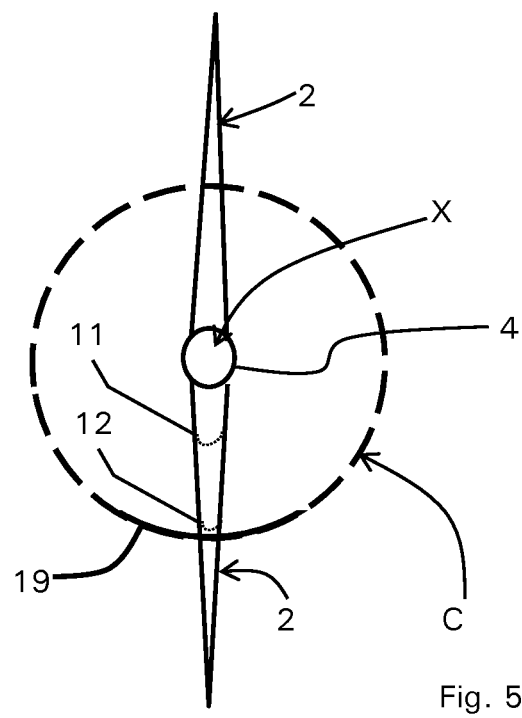

FIG. 5 shows a front view of the rotor from of FIG. 4. The position of the half-profiles 11, 12 detected by the laser distance measurement on the measurement sections 9, 10 (FIG. 3) is drawn with dashed lines on the rotor blade 2. The measurement sections 9, 10 are arranged so that, within one or more segments 19 of a circle "C" around the rotor axis "X", the measurement sections are swept by the at least two rotor blades 2. The measurement sections 9, 10 extend in an angular range of +/−20° with respect to the rotor axis "X" and or are arranged vertically. Advantageous embodiments include that the at least two measurement sections 9, 10 may be oriented so that the at least two measurement sections are located within a common plane which is arranged in particular parallel to the rotor axis "X" and/or at an angle of less than +/−20° with respect to the rotor axis "X", and/or is arranged vertically. Particularly advantageously, the measurement section 9 or 10 is arranged, and/or the measurement sections 9, 10 are arranged and/or oriented so that the rotor blades 2 of the rotor sweep 3 through the measurement section 9 or 10 in a segment 19 of the circle "C" around the rotor axis "X" with a circular segment extent of +/−20°, in particular +/−10°, around the vertical. Particularly advantageously, the rotor blades 2 sweep through the measurement section 9, 10 on a vertical through the rotor axis "X".

FIG. 6 shows the measurement lines of the measurements of the two measurement sections 9, 10. They represent half-profiles 11, 12. Interpolation points 13 are drawn on them. Between the interpolation points 13, connection lines 14 are drawn. Here, the interpolation points 13 of a connection line 14 are arranged or selected so that there is a very small temporal difference, in particular of less than 5 ms, between their sweep through the measurement section.

FIG. 7 shows the measurement lines 11, 12 from FIG. 6. The rotor blade surface 16 has been partially reconstructed by means of the connection lines 14. The lines between the interpolation points 13 here illustrate the reconstructed rotor blade partial surface. Also shown is a calculated half-profile 15 perpendicular to the rotor blade longitudinal axis and parallel to the linking lines 17 which in this case also represent lines 18. This was determined by means of the connection lines and a section through them, perpendicular to the rotor blade longitudinal axis. Alternatively, based on the angle between the horizontal and the measurement sections, on the connection lines, corresponding points can be calculated, which are perpendicular to a plane which is perpendicular to the rotor blade longitudinal axis and in which a line (18) is in particular perpendicular to the trailing edge. FIG. 7 shows at least a first and a second connection line determined between at least two interpolation points 20, 21 which are each given by a measurement point or a point on an interpolation of the measurement points of a measurement line (indicated by the arrow and reference number 22).

Figure 8:
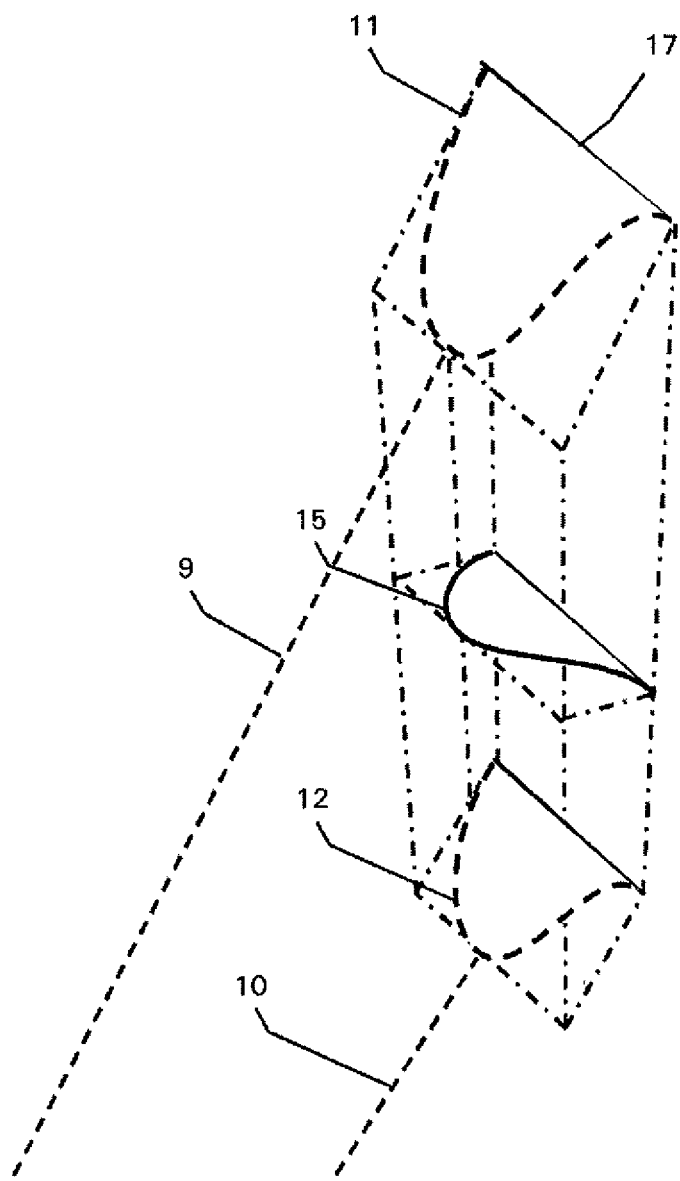

FIG. 8 illustrates this situation again. Shown are two measurement sections 9, 10 and two slanted half-profiles 11, 12 formed by measurement lines and detected on the measurement sections. Also shown between the slanted half-profiles 11, 12 is a half-profile perpendicular to the rotor blade longitudinal axis, which was calculated from the slanted half-profiles. The additional dashed lines which represent a slanted section of a cuboid are only provided to illustrate the three-dimensionality.

LIST OF REFERENCE NUMERALS

1 Wind turbine
2 Rotor blade
3 Rotor
4 Hub
5 Measurement section
6 Time span
7 Time axis
8 Distance measurement value
9 First measurement section
10 Second measurement section
11 First slanted half-profile
12 Second slanted half-profile
13 Interpolation point
14 Connection line
15 Half-profile perpendicular to the rotor blade longitudinal axis
16 Reconstituted rotor blade partial surface
17 Linking line
18 Line
19 Segment of a circle
20 interpolation point
21 interpolation point
22 measurement line

The invention claimed is:

1. A method for determining a pitch angle of a rotor blade of a wind turbine rotor rotating around a rotor axis, comprising:
 positioning a measuring device a distance away from a base of a tower of the wind turbine,
 directing a first laser beam and a second laser beam from the measuring device towards the rotor and at different angles from one another relative to the horizontal, wherein the directed first laser beam comprises a first measurement section and the second laser beam comprises a second measurement section;
 rotating the rotor about the rotor axis;
 simultaneously sweeping the rotor blade through the first measurement section and the second measurement section during rotation of the rotor;
 detecting, with the first laser beam and the second laser beam, the sweep of the rotor blade through the first measurement section and the second measurement section;
 measuring with the first laser beam and the second laser beam at least twenty distance measurement values at at least twenty measurement points on the rotor blade;
 generating, with the measuring device, at least a first connection line and a second connection line between at least two interpolation points which are given in each case by a measurement point or a point on an interpolation of the measurement points of a measurement line, wherein the at least two interpolation points lie at least on two different measurement lines, and wherein the measurement lines in each case are given by connecting the measurement points at which the measurement values of a respective measurement section on the rotor blade were obtained;
 wherein the first laser beam and the second laser beam are arranged in such a way that the first measurement section and the second measurement section are oriented such that there is a maximum temporal spacing of ⅕ s or a maximum temporal spacing in which the rotor is rotated maximally by 0.5° around the rotor axis between the sweep of a first of the at least two interpolation points of a connection line to a second of the at least two interpolation points of the connection line sweeping through the measurement sections.

2. The method according to claim 1, further comprising:
 orienting, with the measuring device, the at least two measurement sections so that they are located within a common plane, and wherein the common plane is arranged parallel to the rotor axis or at an angle of less than +/−20° with respect to the rotor axis or is arranged vertically.

3. The method according to claim 1, further comprising:
calculating, with the measuring device, a half-profile of the rotor blade from the measurement values at the measurement points;
wherein the half-profile is perpendicular to an edge of the rotor blade or perpendicular to the first or second connection line, or parallel to a plane perpendicular to the rotor axis.

4. The method according to claim 1, wherein the method is carried out using the angles between the first and second measurement sections and the horizontal.

5. The method according to claim 1, further comprising interpolating, with the measuring device, an assumed rotor blade surface or rotor blade partial surface by connecting multiple connection lines or by generation of a half-profile as a section through the assumed rotor blade surface.

6. The method to claim 5, wherein the pitch angle is determined as an angle between a plane perpendicular to the rotor axis and a line which extends parallel to a linking line from the leading edge to the trailing edge of the rotor blade or to the calculated half-profiles or which extends perpendicularly to an edge of the rotor blade or perpendicularly to at least one of the first or second connection line,
wherein the line intersects the first and a second connection line or extends perpendicularly thereto,
wherein the first laser beam and the second laser beam are arranged in such a way that the first measurement section and the second measurement section are oriented such that the interpolation points between which the first connection line extends have a maximum temporal spacing of ½ s or a maximum temporal spacing in which the rotor is rotated by maximally 1° from the leading edge of the rotor blade, and
the measurement points between which the second connection line extends have a maximum temporal spacing of ½ s or a maximum temporal spacing in which the rotor is rotated maximally by 1° around the rotor axis, from the trailing edge of the rotor blade.

7. A method according to claim 6, utilized, by the measuring device, to determine a torsion of the rotor blade as a deviation between two pitch angles, wherein the pitch angles are each defined as angles between a plane perpendicular to the rotor axis and in each case a different line, wherein the first line used for determining the first pitch angle lies between interpolation points of a first and a second measurement line, and the second line used for determining the second pitch angle lies between interpolation points of a third measurement line and the second measurement line or of the third measurement line and a fourth measurement line, wherein, with respect to the horizontal, the inclination angle of the measurement section of the first measurement line is smaller than that of the second measurement line, which is smaller than that of the third measurement line or, with respect to the horizontal, the inclination angle of the measurement section of the first measurement line is smaller than that of the second measurement line, which is smaller than that of the third measurement line, which is smaller than that of the fourth measurement line.

8. The method for determining according to claim 1, wherein implementation of the method is independent of stationary reference points or independent of additional measurement instruments.

9. A method for determining a torsion of a rotor blade of a rotor rotating around a rotor axis is determined as angles between two lines;
wherein, by contactless distance measurement by a measuring device located a distance from the rotor on at least two measurement sections generated by at least two laser beams of the measuring device, which at least two measurement sections are not parallel to the rotor axis and which are oriented so that the at least two measurement sections are at least also simultaneously swept by a rotor blade, at least during the sweep of the rotor blade through the measurement sections on each measurement section, at least twenty distance measurement values are measured by the laser beams of the measuring device, wherein the angles between the measurement sections and the horizontal are measured, and wherein at least a first and a second connection line are determined by the measuring device in each case between at least two interpolation points which are given in each case by a measurement point or point on an interpolation of the measurement points of a measurement line, wherein the interpolation points lie at least on two different measurement lines, and wherein the measurement lines in each case are given by the measuring device connecting the measurement points at which the measurement values of a respective measurement section on the rotor blade were obtained, wherein, the first laser beam and the second laser beam are arranged in such a way that the first measurement section and the second measurement section are oriented such that, between the sweep of the interpolation points of a connection line through the measurement sections, there is a maximum temporal spacing of ⅕ s or a maximum temporal spacing in which the rotor is rotated maximally by 0.5° around the rotor axis;
which two lines in each case extend parallel to a linking line from a leading edge to a trailing edge of the rotor blade or which extend perpendicularly to an edge of the rotor blade or perpendicularly to at least a first or a second connection line; and
wherein the lines intersect the first and a second connection line or extends perpendicularly thereto, wherein the first laser beam and the second laser beam are arranged in such a way that the first measurement section and the second measurement section are oriented such that the interpolation points between which the first connection line extends have a maximum temporal spacing of ½ s or a maximum temporal spacing in which the rotor is rotated maximally by 1° around the rotor axis, from the leading edge of the rotor blade; and
the measurement points between which the second connection line extends have a maximum temporal spacing of ½ s or a maximum temporal spacing in which the rotor is rotated maximally by 1° around the rotor axis, from the trailing edge of the rotor blade, are defined;
wherein the first line lies between interpolation points of a first measurement line and a second measurement line, and the second line lies between interpolation points of a third measurement line and the second measurement line or of the third measurement line and a fourth measurement line, wherein, with respect to the horizontal, the inclination angle of the measurement section of the first measurement line is smaller than that of the second measurement line, which is smaller than that of the third measurement line, or, with respect to the horizontal, the inclination angle of the measurement section of the first measurement line is smaller than that of the second measurement line, which is smaller than that of the third measurement line, which is smaller than that of the fourth measurement line.

10. The method for determining according to claim 9, wherein implementation is independent of stationary reference points or independent of additional measurement instruments.

11. A method for determining an imbalance or an eccentric moment of inertia of a rotor of a wind turbine, wherein the rotor rotates around a rotor axis and includes at least two rotor blades, wherein the method comprises:
    positioning a measuring device a distance away from a base of a tower of the wind turbine,
    directing a first laser beam from the measuring device towards the rotor, wherein the directed first laser beam comprises a first measurement section;
    rotating the at least two rotor blades about the rotor axis;
    sweeping the at least two rotor blades through the first measurement section during rotation;
    detecting, with the first laser beam, the sweep of a first rotor blade of the at least two rotor blades through the first measurement section;
    detecting, with the first laser beam, the sweep of a successive rotor blade of the at least two rotor blades through the first measurement section;
    determining, with the measuring device, a first time span between when the first rotor blade sweeps the first measurement section and when the successive rotor blade sweeps the first measurement section;
    repeatedly sweeping the first measurement section with the first rotor blade and the successive rotor blade as the rotor continues to rotate;
    determining, with the measuring device, a successive time span for each time the first rotor blade and the successive rotor blade sweep the first measurement section;
    calculating a difference between the first time span and the successive time span; and
    determining an imbalance in the rotor or an eccentric moment of inertia of the rotor when the first time span differs from the successive time span.

12. The method for determining according to claim 11, further comprising normalization of the time spans with respect to the rotational speed of the at least two rotor blades.

13. The method for determining according to claim 12, further comprising associating of the time spans or normalized time spans between the sweeps of the successive rotor blades through the measurement section after the respective time span.

14. The method for determining according to claim 11, wherein the measurement section is oriented at an angle of +/−20° relative to the rotor axis, and is arranged so that, within one or more segments of a circle around the rotor axis, the measurement section is swept by the at least two rotor blades.

15. The method for determining according to claim 11, wherein implementation of the method is independent of stationary reference points or independent of additional measurement instruments or independent of additional information with regard to the design of a profile of the at least two rotor blades.

16. The method of determining according to claim 11, further comprising:
    directing a second laser beam from the measuring device towards the rotor, wherein the directed second laser beam comprises a second measurement section;
    sweeping the at least two rotor blades through the measurement section and the second measurement section during rotation of the rotor;
    detecting, with the second laser beam, the sweep of the first rotor blade through the second measurement section;
    detecting, with the second laser beam, the sweep of the successive rotor blade through the second measurement section;
    determining, with the measuring device, a first time span between when the first rotor blade sweeps the second measurement section and when the successive rotor blade sweeps the second measurement section;
    repeatedly sweeping the second measurement section with the first rotor blade and the successive rotor blade as the rotor continues to rotate;
    determining, with the measuring device, a successive time span for each time the first rotor blade and the successive rotor blade sweep the second measurement section;
    calculating a difference between the first time span and the successive time span for the sweeping of the second measurement section; and
    determining an imbalance in the rotor or an eccentric moment of inertia of the rotor when the first time span for sweeping the second measurement section differs from the successive time span for sweeping the second measurement section.

17. The method of determining according to claim 16, further comprising:
    directing the first laser beam towards the rotor at a first angle relative to the horizontal; and
    directing the second laser beam towards the rotor at second angle relative to the horizontal, wherein the first angle is different from the second angle.

18. The method of determining according to claim 16, further comprising: simultaneously sweeping the first measurement section and the second measurement section.

* * * * *